US006792574B1

United States Patent
Sugiyama

(10) Patent No.: US 6,792,574 B1
(45) Date of Patent: Sep. 14, 2004

(54) COMPUTER-BASED PATIENT RECORDING SYSTEM

(75) Inventor: Takashi Sugiyama, Hashima (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/276,518

(22) Filed: Mar. 25, 1999

(30) Foreign Application Priority Data

Mar. 30, 1998 (JP) .......................................... 10-103600

(51) Int. Cl.[7] .......................................... G06F 17/24
(52) U.S. Cl. ................................................ 715/507
(58) Field of Search ............................ 707/507, 500, 707/530, 531; 705/2, 3; 715/530, 500, 505, 507, 531, 506

(56) References Cited

U.S. PATENT DOCUMENTS

| | | | | | |
|---|---|---|---|---|---|
| 5,031,121 | A | * | 7/1991 | Iwai et al. ................... | 707/515 |
| 5,148,366 | A | * | 9/1992 | Buchanan et al. ............ | 715/531 |
| 5,247,611 | A | * | 9/1993 | Norden-Paul et al. ....... | 345/156 |
| 5,392,428 | A | * | 2/1995 | Robins ........................ | 707/101 |
| 5,461,716 | A | * | 10/1995 | Eagen et al. ................. | 345/733 |
| 5,526,407 | A | * | 6/1996 | Russell et al. ............... | 379/88.01 |
| 5,772,585 | A | * | 6/1998 | Lavin et al. ................. | 600/300 |
| 5,809,476 | A | * | 9/1998 | Ryan ............................ | 705/2 |
| 5,817,137 | A | * | 10/1998 | Kaemmerer ................. | 607/59 |
| 5,924,074 | A | * | 7/1999 | Evans .......................... | 705/3 |
| 6,026,363 | A | * | 2/2000 | Shepard ....................... | 434/321 |
| 6,031,526 | A | * | 2/2000 | Shipp .......................... | 707/500.1 |
| 6,108,635 | A | * | 8/2000 | Herren et al. ................ | 705/3 |
| 6,182,047 | B1 | * | 1/2001 | Dirbas ......................... | 705/3 |

FOREIGN PATENT DOCUMENTS

JP   01177167 A   7/1989

OTHER PUBLICATIONS

Boyce et al., "Using Microsoft Office 97", copyright 1997 by Que Corporation, pp. 265–267.*
Boyce et al., "Using Microsoft Office 97", copyright 1997 by Que Corporation, pp. 23–25 and 238–245.*

* cited by examiner

*Primary Examiner*—Stephen S. Hong
*Assistant Examiner*—Doug Hutton
(74) *Attorney, Agent, or Firm*—Westerman, Hattori, Daniels & Adrian, LLP

(57) ABSTRACT

The computer-based patient recording system according to the present invention has the following component:

An inputting means for inputting a text and break points thereof, a saving means for saving the input text divided into unit-texts in respective identifiable memory areas, a selecting means for selecting a unit text, an inputting means for inputting an instruction of displaying an item select window, an item selecting means for selecting any item from among the items displayed in the item select window, and a relating means for relating the memory area in which the selected unit text is saved to the selected item. According to the above configuration, each input unit text is saved into each identifiable memory area by a simple operation of breaking the text. Also, when the desired unit text and item are selected, the memory area for such unit text is related to such item.

22 Claims, 6 Drawing Sheets

Input data display area according to item

Pop-up Menu

Fig.6

| Item Number 1 | Number of Areas a | Area 1-1 | Area 1-2 | ... | Area 1-a |
| Item Number 2 | Number of Areas b | Area 2-1 | Area 2-2 | ... | Area 2-b |
| Item Number 3 | Number of Areas c | Area 3-1 | Area 3-2 | ... | Area 3-c |
| Item Number m | Number of Areas n | Area m-1 | Area m-2 | ... | Area m-n |
| Item Number x | Number of Areas z | Area x-1 | Area x-2 | ... | Area x-z |

COMPUTER-BASED PATIENT RECORDING SYSTEM

BACKGROUND OF THE INVENTION

1. Field of the Invention

The present invention relates to a computer-based patient recording system which can save various medical diagnosis data obtained at the time of medical consultation or examination by means of itemized text input of such data.

2. Related Art

A computer-based patient recording system has been provided which can input medical diagnosis data, such as subjective data (e.g., clinical history told by patients), objective data (e.g., observations by medical doctors) and medical data (e.g., disease names determined by medical doctors, medical treatment and prescription performed by medical doctors) and save the same in a medical diagnosis data file in a storage medium (e.g., a hard disk).

Among of all the medical diagnosis data, the data of the performance of medical doctors (e.g., treatment, prescription) are easy to input in a predetermined sequence on predetermined items. Such data are also used for the calculation of treatment fee with health insurance coverage. Therefore, a code input method which is easy to input and suitable to the secondary use of the data has been adopted.

On the other hand, clinical history, observations, etc. are difficult to input as such data are diversely classified and the classification boundaries are not always clear. Also, such data are obtained based on the data provided by patients at random through the interactive medical interview with patients. For this reason, it may be difficult to quickly classify such data into the respective items as specified. In other words, as patients do not always orderly tell and occasionally they may tell out of sequence, such data are more difficult to input in a predetermined order. Under the circumstances, for inputting the data of clinical history, observations, etc., a text input method has been adopted.

SUMMARY OF THE INVENTION

The text input method is divided into two methods: plain-text input method which allows free text input like handwriting on white paper, and itemized input method which allows input according to pre-classified items.

When the plain-text input method is used, various data, such as data provided by patients and determinations made by medical doctors, can be quickly input as they are in order of receiving without switching the input screen, input window, or input area. However, due to a serious defect that the secondary use of data is difficult, this method has not yet been adopted.

On the other hand, when the itemized input method is used, data can be input according to the item stratification. This method has been widely adopted by computer-based patient recording systems.

Here, the conventional itemized input method will be described referring to FIG. 2. A medical doctor listens to a patient. When the medical doctor determines that the patient tells about his/her "family history," the medical doctor moves a pointer to the family history button of all input item buttons displayed in the input data display window (or screen) as shown on the left side of FIG. 2, and presses the family history button. Then, an input window (or screen) for the family history item as shown on the right side of FIG. 2 appears. The input window (or screen) of each item has input assisting tools which enable efficient inputting work. The medical doctor input the text by using these input assisting tools. When the input is completed and the OK button is pressed, the input data display window (or screen) as shown on the left side of FIG. 2 reappears. In the input data display window (or screen), the text input in the family history input window (or screen) as shown on the right side of FIG. 2 is displayed in the itemized input data display area of the family history item.

The medical doctor continuously listens to the patient, and in the same way as above, presses an intended input item button, inputs a text in the same way as above, and has the input data display window (or screen) reappear as shown in the left side of FIG. 2. Subsequently, the medical doctor continues inputting work by repeating such input operation as described above.

As seen above, when the itemized input method is used, as it is necessary to switch the input window, the operation is too troublesome for medical doctors to easily perform the inputting work while listening to patients, which poses a problem.

In view of the above, an object of the present invention is to provide a computer-based patient recording system which enables medical doctors to easily input data like using the plain-text input method while listening to their patients and easily make the secondary use of the input data like using the itemized input method.

To achieve this objective, the computer-based patient recording system according to the present invention is constructed, for example, as described below:

The computer-based patient recording system comprises a text inputting means for inputting a text and breakpoints thereof, a unit-text saving means for saving the input text divided into unit-texts in respective identifiable memory areas, a unit-text selecting means for inputting the selection of a unit text, a display-instruction inputting means for inputting an instruction of displaying an item select window, an item selecting means for inputting the selection of any item from among the items displayed in the item select window, and a memory-area-item relating means for relating the memory area in which the unit text selected by the unit-text selecting means is saved to the item selected by the item selecting means.

According to the above configuration, each input unit text is saved into each identifiable memory area by a simple operation of breaking the text. Also, when the desired unit text is selected and the item which is determined by the medical doctor to be applicable to such unit text is selected, the memory area for such unit text is related to such item.

The computer-based patient recording system according to the present invention may also be configured as described below:

The computer-based patient recording system comprises a text inputting means for inputting a text and breakpoints thereof, a unit-text extracting means for extracting the text from the previous breakpoint to the current breakpoint as a unit text, a display control means for displaying the item select window when the text breakpoint is input, an item selecting means for inputting the selection of any item from among the items displayed in the item select window, and a memory-area-item relating means for relating the unit text extracted by the unit-text extracting means to the item selected by the item selecting means.

According to the above configuration, each unit text is extracted by a simple operation of breaking a text, and at the same time, the item select window is displayed. Also, the extracted unit text is saved by being related to the item which is determined applicable by the medical doctor.

BRIEF DESCRIPTION OF THE DRAWINGS

FIG. 6 is a configuration view of a memory-area-item relating file which relates the memory area of each unit text in a medical diagnosis file to item No.

EMBODIMENTS

Figure 1:
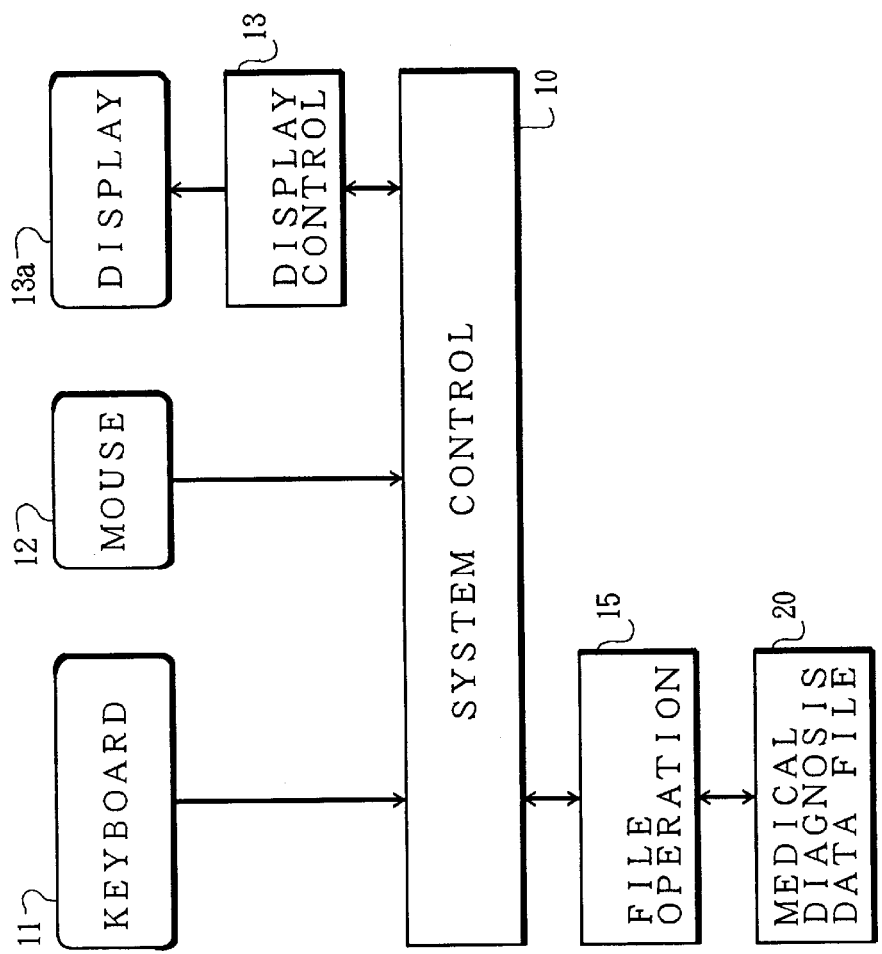
FIG. 1 is a block diagram of a computer-based patient recording system according to the first and second embodiments of the present invention.
Figure 2:
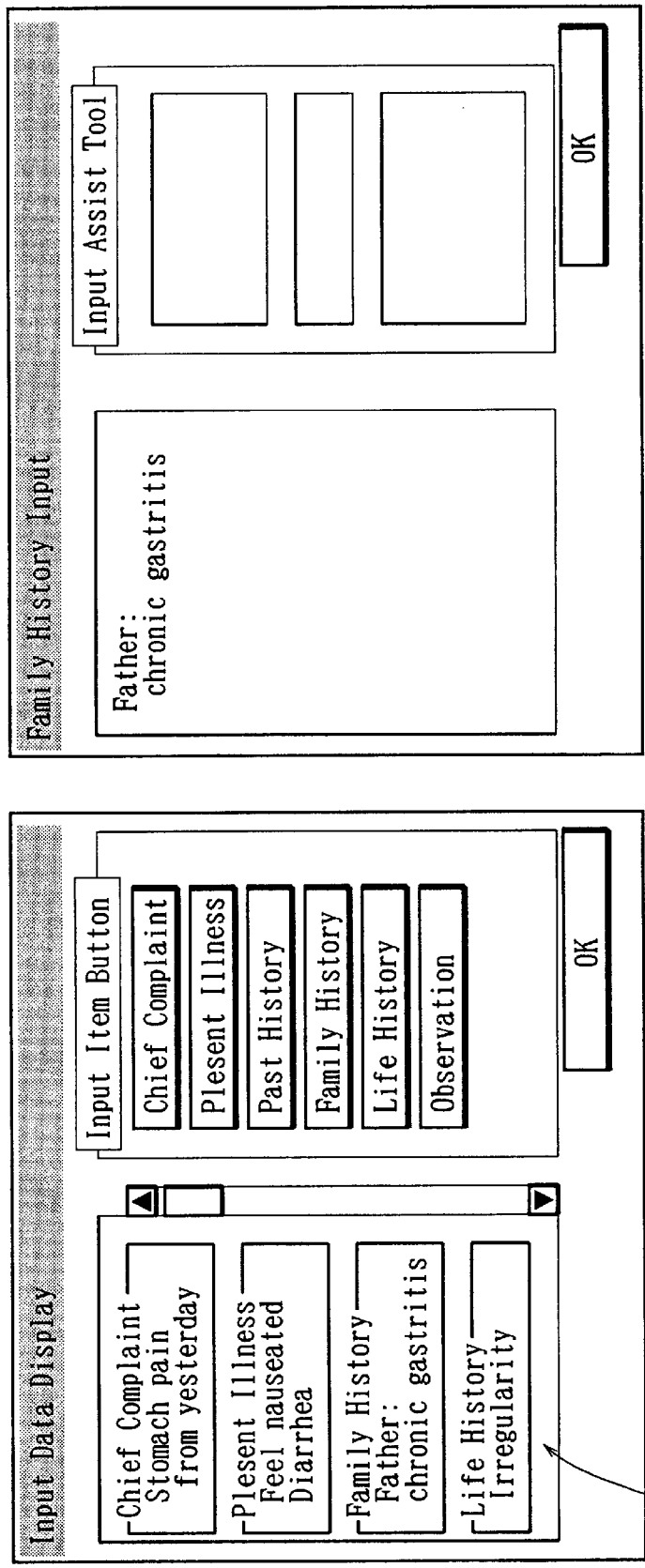
FIG. 2 is a view illustrating a conventional itemized input method, wherein a view on the left side illustrates an input data display window (or screen), and a view on the right side illustrates a family history input window (or screen)

Now, referring to the appended drawings, the computer-based patient recording system according to embodiments will be described. FIG. 1 shows the system configuration according to the first and second embodiments of the present invention. The illustrated system has a keyboard 11, a mouse 12, a display control 13, a display 13a controlled by the display control 13, a system control 10, a file operation 15, and a medical diagnosis data file 20 recorded in a hard disk or alternative storage medium.

The function of inputting a text and its breakpoints is realized by the keyboard 11, for example. Here, it may be so arranged that the function of inputting a text and its breakpoints is realized via voice, handwriting on a digitizing tablet, selection among from displayed keywords or codes, and so on. The function of inputting the selection of a unit text or an item is realized by clicking the left button of the mouse 12. The function of displaying the pop-up menu of the item select window, etc. is realized by clicking the right button of the mouse 12. The function of saving the unit text in the identifiable memory area thereof, relating the memory area in which the unit text has been saved to the applicable item thereof, or extracting the text from the previous breakpoint to the current breakpoint as a unit text is achieved by functioning the system control 10, the display control 13, the file operation 15, and the medical diagnosis data file 20 independently or dependently.

The system according to the present invention is configured as an independent system is shown in FIG. 1. However, the system according to the present invention may be configured as a component of a communication network of a hospital. For example, it may be so arranged that the system control 10, the file operation 15, and the storage unit having the medical diagnosis data file 20, etc. are housed in a system server, and terminal units having input and output functions are placed in respective consultation rooms of medical doctors.

Figure 3:
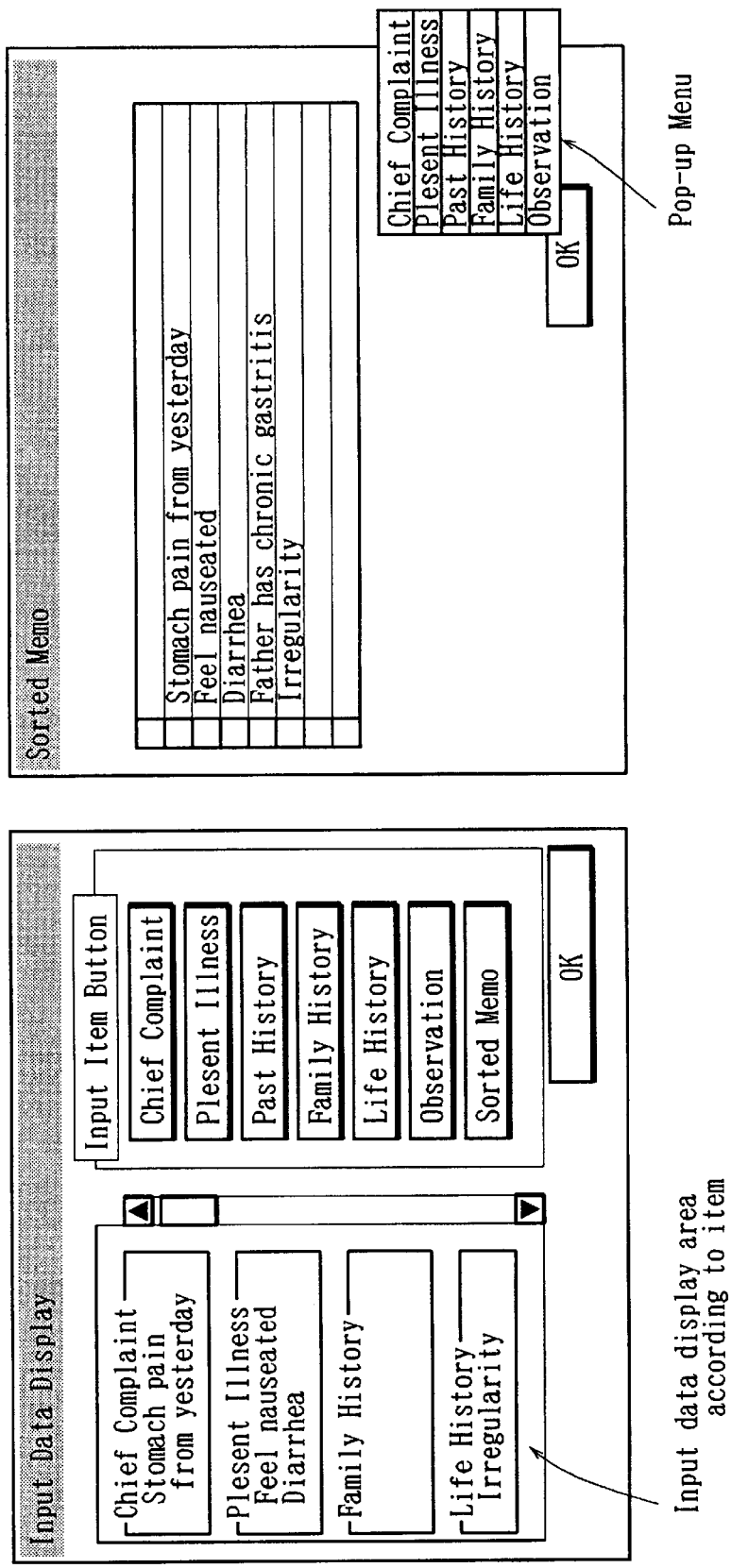
FIG. 3 is a view illustrating an itemized input method of the computer-based patient recording system of FIG. 1, wherein a view on the left side illustrates an input data display window (or screen), and a view on the right side illustrates an sorted memo input window (or screen)

Now, description will be given to the operation of the system according to the present invention after such system is started and the input data display window (or screen) as shown on the left side of FIG. 3 is displayed by the performance of a predetermined input procedure.

First Embodiment

Figure 4:
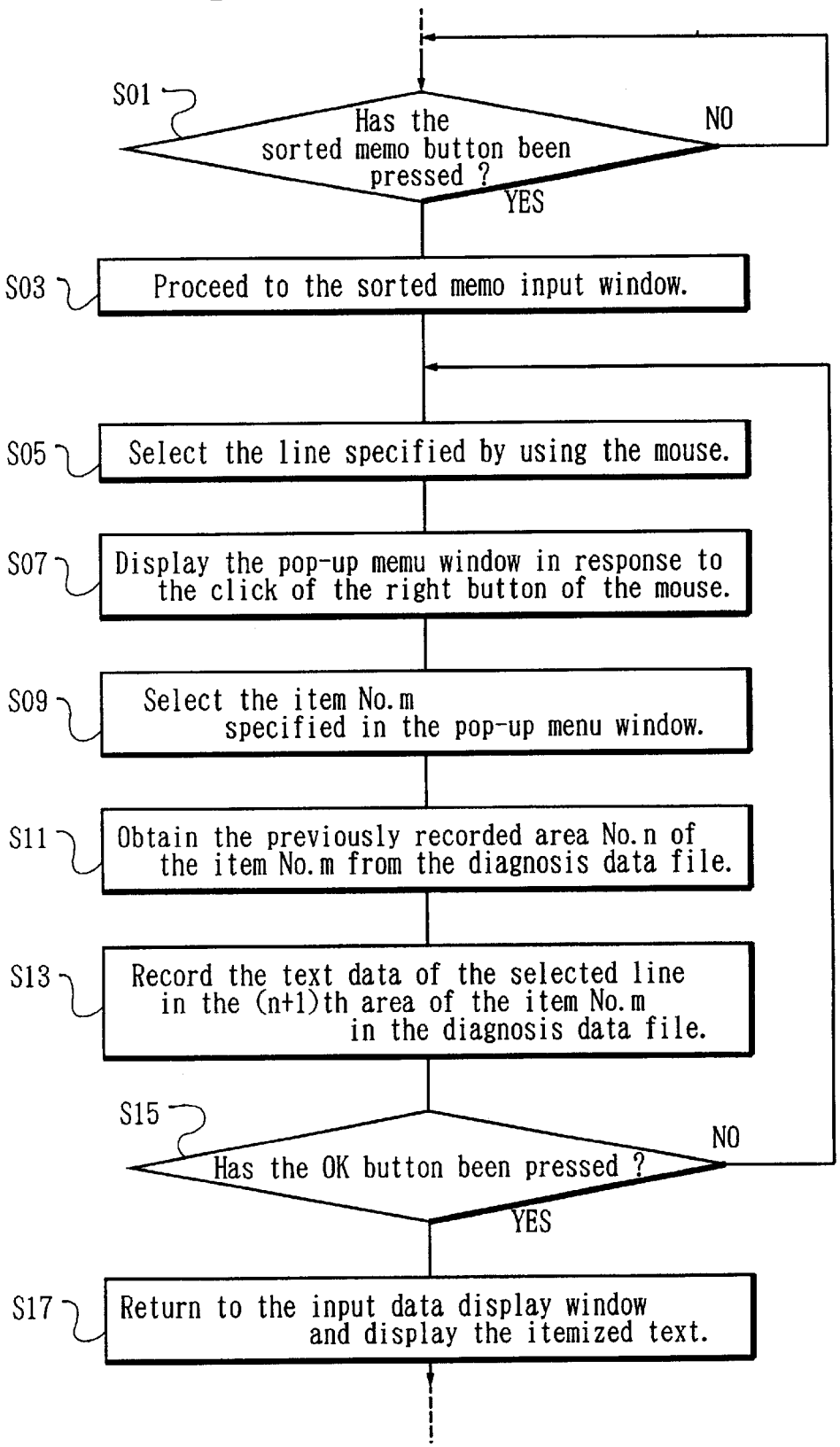
FIG. 4 is a flow chart illustrating a procedure of the first embodiment applicable to the operation of the sorted memo input window (or screen) of FIG. 3.

The first embodiment is shown in FIG. 4. In the input data display window (or screen) as shown on the left side of FIG. 3, when the pointer is located on the sorted memo button and the left button of the mouse is clicked (S01, YES), the pointer shifts to the sorted memo input window (or screen) as shown on the right side of FIG. 3 (S03).

When a medical doctor or an assistant to the medical doctor inputs a text from the sorted memo input window (or screen) while listening to a patient, the input text is saved in a predetermined memory area. When the medical doctor or the assistant to the medical doctor presses the enter key according to the break or development of the story of the patient, the line feed is displayed in the sorted memo input window (or screen) and at the same time the text from the previous pressing of the enter key to the current pressing of the enter key is saved as a unit text in the identifiable memory area. That is, the text is recorded in the unit text file in the medical data file 20 so that the text can be specified and read later.

When the text input is completed and the desired unit text is specified by clicking the left button of the mouse 12, the specified unit text is selected by the system control 10 (S05). Here, the completion of the text input can be freely decided by the intention of the input operator including a case of temporary completion. Incidentally, according to the first embodiment, as the text is broken by pressing the enter key, the desired unit text is selected by inputting the specification through the mouse.

After the selection of the unit text, when the right button of the mouse 12 is clicked, the pop-up menu of items for use in selecting the desired item as shown on the right side of FIG. 3 is displayed by the system control 10 through the display control 13 (S07). Here, the items of the pop-up menu are chief complaint, present illness, past history, family history, life history and observation as shown in FIG. 3. Incidentally, these items are examples, and needless to say, can be suitably added or changed.

After the specifying of the desired item from among the items in the pop-up menu by operating the mouse 12 or the alternative, the item No. m (See FIG. 6) of the specified item is selected from the memory-area-item relating file in the diagnosis data file 20 by the system control 10 through the file operation 15 (S09). The file operation 15 obtains the number of areas n related to the item of the item No. m (S11). Here, the number of areas n is the number of the memory areas which have already been recorded in relation to the item of the item No. m, i.e., the number of the contents of such item recorded while listening to the subject patient in the past.

Next, the file operation 15 saves the selected unit text in the identifiable memory area thereof, and at the same time, records the data indicating such memory area by providing the (n+1)th area in the item of the item No. m (S13), i.e., saves the unit text selected in the step S05 as the (n+1)th unit text of the item of the item No. m in relation to such item. Although this embodiment is so configured as to realize the saving in the step S13, alternatively it may be so arranged that the text is recorded when the same is input and then the address thereof is recorded in relation to the item No. m in the step S13.

After the completion of relating the selected unit text to the item as described above, whether the OK button displayed in the sorted memo input window (or screen) as shown in FIG. 3 has been pressed or not is determined. If it is so determined that the OK button has not been pressed (S15: NO), the process returns to the step S05, and the next unit text is processed in the same way. When it is so determined that the OK button has been pressed (S15: YES), the process returns to the input data display window (or screen), and each unit text input and itemized from the sorted memo input window (or screen) is displayed in each item (S17). FIG. 3 shows the results of the step S17 on the left side.

Second Embodiment

Figure 5:
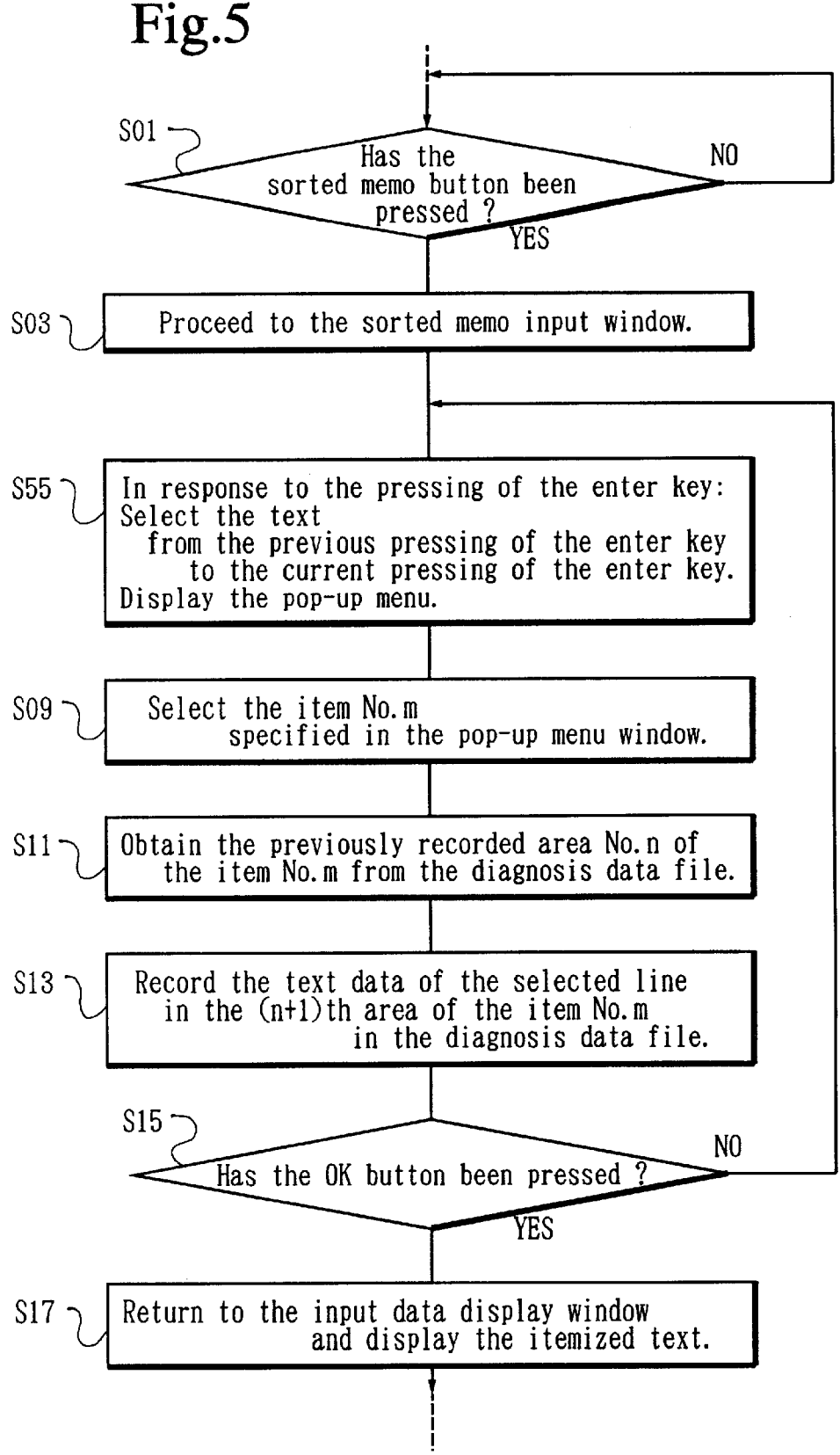
FIG. 5 is a flow chart illustrating a procedure of the second embodiment applicable to the operation of the sorted memo input window (or screen) of FIG. 3.

The second embodiment is shown in FIG. 5. Like FIG. 4, FIG. 5 shows the procedure applicable to the operation in the sorted memo input window (or screen) which can be switched by pressing the sorted memo button in the input data display window (or screen) (S01: YES) as shown on the left side of FIG. 3. FIG. 5 is almost the same as FIG. 4, and those steps in FIG. 5 which are identical to those in FIG. 4 are identified with the same step Nos. The procedure of FIG. 5 is different from that of FIG. 4 in that the pop-up menu for selecting the item is displayed according to the pressing of the enter key for breaking the unit text (S55). By processing in this way, the input operation for displaying the pop-up menu (clicking the right button of the mouse 12 in FIG. 4) can be omitted, providing an effect that the input operator can save labor required for this operation.

As described above, according to the present invention, the text freely broken by the intention of the input operator (e.g., medical doctor) while listening to the patient is handled as a unit text broken at a breakpoint and saved in relation to one of the items listed in electronic medical record cards. As a result, in the computer-based patient recording system, an easy-to-input environment of the plain-text input method can be realized and the data saving suitable to the secondary use thereof, which is a feature of the itemized input method, can be realized.

PARTS LIST 10 system control
11 keyboard
12 mouse
13 display control
13a display
15 file operation
20 medical diagnosis data file

What is claimed is:

1. A computer-based patient recording system which has a medical diagnosis data file, comprising:
    an inputting device for inputting a text, breakpoints thereof, and instructions;
    a text divider for dividing a text input in a predetermined text-box into unit texts at an input breakpoint;
    a unit-text saving means for saving each of the unit texts in respective identifiable memory areas of a subject patient in the medical diagnosis data file;
    a unit-text selector for selecting a unit text specified by an input instruction from among the saved unit texts;
    an item-select-window displaying means for displaying an item select window in response to an input instruction;
    an item selector for selecting an item specified by an input instruction from among pre-classified items of medical diagnosis data displayed in the item select window; and
    a relating means for relating each memory area in which the unit text selected by the unit-text selector is saved to the corresponding item selected by the item selector to be able to use such unit text as one of contents of such item of the subject patient,
    wherein the item selected by the item selector is specified before the unit text is selected by the unit-text selector.

2. A computer-based patient recording system according to claim 1, wherein the breakpoint is input by pressing the enter key in the inputting device.

3. A computer-based patient recording system according to claim 1, wherein the item select window is displayed as a pop-up menu.

4. A computer-based patient recording system according to claim 1, wherein the text is input by using a keyboard.

5. A computer-based patient recording system according to claim 1, wherein the text is input by using a microphone and voice recognition system.

6. A computer-based patient recording system which has a medical diagnosis data file, comprising:
    an inputting device for inputting a text, breakpoints thereof, and instructions;
    a unit-text extractor for extracting a text input in a predetermined text-box and divided from a previously input breakpoint to a currently input breakpoint as a unit text;
    a unit-text saving means for saving the extracted unit text in an identifiable memory area of a subject patient in the medical diagnosis data file;
    a unit-text selector for selecting the extracted unit text in response to its extraction;
    a display controller for displaying an item select window in response to every extraction of each unit text;
    an item selector for selecting an item specified by an input instruction from among pre-classified items of medical diagnosis data displayed in the item select window; and
    a relating means for relating each memory area in which the unit text selected by the unit-text selector is saved to the corresponding item selected by the item selector to be able to use such unit text as one of such item of the subject patient,
    wherein the item selected by the item selector is specified before the unit text is selected by the unit-text selector.

7. A computer-based patient recording system according to claim 6, wherein the breakpoint is input by pressing the enter key in the inputting device.

8. A computer-based patient recording system according to claim 6, wherein the item select window is displayed as a pop-up menu.

9. A computer-based patient recording system according to claim 6, wherein the text is input by using a keyboard.

10. A computer-based patient recording system according to claim 6, wherein the text is input by using a microphone and voice recognition system.

11. A method for recording medical diagnosis data in a medical diagnosis data file, comprising the steps of:
    dividing a text input in a predetermined text-box into unit texts at an input breakpoint;
    saving the unit texts in respective identifiable memory areas of a subject patient in the medical diagnosis data file;
    selecting a unit text specified by an input instruction from among the saved unit texts;
    displaying an item select window in response to an input instruction;
    selecting an item specified by an input instruction from among pre-classified items of medical diagnosis data displayed in the item select window; and relating each memory area in which the selected unit text is saved to the selected item to be able to use such unit text as one of contents of such item of the subject patient, wherein the item selected by the item selector is specified before the unit text is selected by the unit-text selector.

12. A method for recording medical diagnosis data on an electronic medical record card according to claim 11, wherein the breakpoint is input by pressing an enter key in an inputting device.

13. A method for recording medical diagnosis data on an electronic medical record card according to claim 11, wherein the item select window is displayed as a pop-up menu.

14. A method for recording medical diagnosis data on an electronic medical record card according to claim 11, wherein the text is input by using a keyboard.

15. A method for recording medical diagnosis data on an electronic medical record card according to claim 11, wherein the text is input by using a microphone and voice recognition system.

16. A method for recording medical diagnosis data in a medical diagnosis data file, comprising the steps of:

extracting a text input in a predetermined text-box and divided from a previously input breakpoint to a currently input breakpoint as a unit text;

saving the extracted unit text in an identifiable memory area of a subject patient in the medical diagnosis data file;

selecting the extracted unit text in response to its extraction;

displaying an item select window in response to every extraction of each unit text;

selecting an item specified by an input instruction from among pre-classified items of medical diagnosis data displayed in the item select window; and relating each memory area in which the selected unit text is saved to the correspondingly selected item to be able to use such unit text as one of contents of such item of the subject patients, wherein the item selected by the item selector is specified before the unit text is selected by the unit-text selector.

17. A method for recording medical diagnosis data on an electronic medical record card according to claim 16, wherein the breakpoint is input by pressing an enter key in an inputting device.

18. A method for recording medical diagnosis data on an electronic medical record card according to claim 16, wherein the item select window is displayed as a pop-up menu.

19. A method for recording medical diagnosis data on an electronic medical record card according to claim 16, wherein the text is input by using a keyboard.

20. A method for recording medical diagnosis data on an electronic medical record card according to claim 16, wherein the text is input by using a microphone and voice recognition system.

21. A storage medium having a computer-executable program, the program comprising the steps of:

dividing a text input in a predetermined text-box into unit texts at an input breakpoint;

saving the unit texts in respective identifiable memory areas of a subject patient in a medical diagnosis data file in a predetermined storage medium;

selecting a unit text specified by an instruction input through a predetermined inputting device from among the saved unit texts;

displaying an item select window on a predetermined display in response to an input instruction;

selecting an item specified by an instruction input through a predetermined inputting device from among pre-classified items of medical diagnosis data displayed in the item select window; and relating each memory area in which the selected unit text is saved to the correspondingly selected item to be able to use such unit text as one of contents of such item of the subject patient, wherein the item selected by the item selector is specified before the unit text is selected by the unit-text selector.

22. A storage medium having a computer-executable program, the program comprising the steps of:

extracting a text input in a predetermined text-box and divided from a previously input breakpoint to a currently input breakpoint as a unit text;

saving the extracted unit text in an identifiable memory area of a subject patient in a medical diagnosis data file in a predetermined storage medium;

selecting the extracted unit text in response to its extraction;

displaying an item select window on a predetermined display in response to every extraction of each unit text;

selecting an item specified by an instruction input through a predetermined inputting device from among pre-classified items of medical diagnosis data displayed in the item select window; and relating each memory area in which the selected unit text is saved to the correspondingly selected item to be able to use such unit text as one of such item of the subject patient, wherein the item selected by the item selector is specified before the unit text is selected by the unit-text selector.

* * * * *